F. W. HURD.
RAIN SHIELD FOR AUTOMOBILES.
APPLICATION FILED AUG. 23, 1918.

1,295,035.

Patented Feb. 18, 1919.

WITNESSES:
Matilda Mittler
Sophia Heine

Fred W. Hurd INVENTOR

BY
ATTORNEY

UNITED STATES PATENT OFFICE.

FRED W. HURD, OF FORT WAYNE, INDIANA.

RAIN-SHIELD FOR AUTOMOBILES.

1,295,035.

Specification of Letters Patent. Patented Feb. 18, 1919.

Application filed August 23, 1918. Serial No. 251,094.

*To all whom it may concern:*

Be it known that I, FRED W. HURD, a citizen of the United States of America, and resident of Fort Wayne, in the county of Allen and State of Indiana, have invented certain new and useful Improvements in Rain-Shields for Automobiles, of which the following is a specification.

This invention relates to improvements in rain shields for automobiles, and is especially adapted to that class of automobiles in which electrical apparatus is situated upon the dash-board beneath the wind-shield and exposed more or less to the penetration of moisture and consequent disablement.

The object of the invention is to afford a device that may readily be applied to such automobiles as those referred to, and that will obviate difficulties arising from the penetration of moisture through the cowl and dash into the electrical apparatus situated beneath the wind-shield.

The objects of the invention are accomplished by the construction illustrated in the accompanying drawings in which:—

Figure 1:
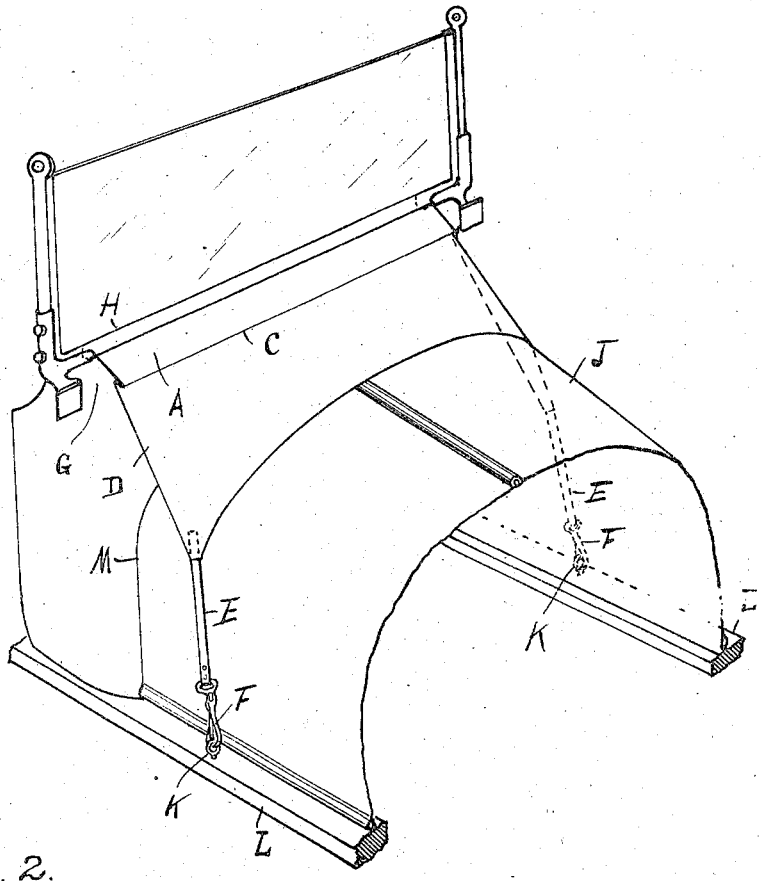
Figure 2:
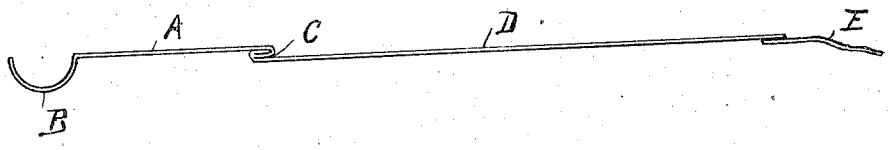

Figure 1 is a view in perspective showing in part an automobile and with the present invention applied thereto; and Fig. 2 is a side elevation of the device, the snap-hooks being omitted.

Similar characters of reference indicate corresponding parts in both views, and referring now to the same:—

A is a ledge consisting of a metallic plate shaped along its rear edge with a curved portion B and at its front edge with an underturned portion C, that part of the ledge between the curved and underturned portion being flat.

Secured in the underturned portion C is the rear edge of an apron D composed of water proof fabric, and to each forward corner of the latter is secured and extends therefrom a strap E having attached at its outer end a snap-hook F.

In applying the device to an automobile, the curved portion B of the ledge is introduced between the cowl G of the automobile and the lower rail H of the wind-shield frame of the automobile with the flat portion of the ledge A extending forwardly over the cowl. The apron D is drawn out over the hood J so as to cover its rear portion and is held in place by connecting the snap-hooks F with suitable eyes K properly located for the purpose on the frame L of the automobile upon the opposite sides of its hood.

When thus placed in position the joint M between the hood and cowl is covered by the apron, and the ledge A with its curved rear portion B affords a shelter that sheds the rain and diverts its course away from the juncture between the cowl and the wind-shield-frame so that the electrical apparatus usually located upon the dash beneath the cowl is sheltered from moisture due to rain striking toward the wind-shield, cowl and hood.

What I claim is:—

In a device of the class described, a metallic ledge having a curved inner edge adapted to be introduced and held between the cowl and wind-shield frame of an automobile, and an apron attached to the forward edge of the ledge and having means attached to each of its forward corners for securing the apron over the juncture between the hood and the cowl of the automobile.

In testimony whereof I affix my signature, in presence of two witnesses.

FRED W. HURD.

Witnesses:
FRANK M. HOGAN,
MATILDA METTLER.